(12) United States Patent
Pankey (10) Patent No.: US 10,973,222 B1
(45) Date of Patent: Apr. 13, 2021

(54) AUTOMATED HOG TRAP

(71) Applicant: Ambush 360, LLC, Blum, TX (US)

(72) Inventor: Walter W. Pankey, Morgan, TX (US)

(73) Assignee: Ambush 360, LLC, Blum, TX (US)

( * ) Notice: Subject to any disclaimer, the term of this patent is extended or adjusted under 35 U.S.C. 154(b) by 550 days.

(21) Appl. No.: 15/682,150

(22) Filed: Aug. 21, 2017

(51) Int. Cl.
*A01M 23/22* (2006.01)
*A01M 31/00* (2006.01)

(52) U.S. Cl.
CPC ........... *A01M 23/22* (2013.01); *A01M 31/002* (2013.01)

(58) Field of Classification Search
CPC ...... A01M 23/16; A01M 23/20; A01M 23/22; A01M 23/02; A01M 23/04; A01M 23/32; A01M 23/34; A01M 1/103; A01M 1/22; A01K 73/05; A01K 69/10; A01K 69/04; A01K 69/02; A01K 69/06; A01K 69/00
USPC ...................................... 43/60, 102
See application file for complete search history.

(56) References Cited

U.S. PATENT DOCUMENTS

| | | | | |
|---|---|---|---|---|
| 878,820 A * | 2/1908 | Murdoch | A01M 23/18 43/61 |
| 2,374,522 A * | 4/1945 | Andrews | A01M 23/22 43/61 |
| 3,815,279 A * | 6/1974 | Poirot | A01K 69/00 43/105 |
| 4,156,984 A * | 6/1979 | Kinser, Sr. | A01K 69/10 43/105 |
| 6,658,788 B1 * | 12/2003 | Steinfest | A01M 23/20 43/61 |
| 7,398,617 B2 | 7/2008 | Mattox | |
| 8,887,435 B2 * | 11/2014 | Ugiansky | A01M 23/22 43/60 |
| 9,668,467 B2 | 6/2017 | Gaskamp et al. | |
| 10,085,438 B1 * | 10/2018 | Dismang | A01M 23/02 |
| 10,375,940 B2 * | 8/2019 | Al-Farhan | A01K 73/12 |
| 2005/0224288 A1 * | 10/2005 | Chesness | A01M 31/02 182/115 |
| 2009/0293340 A1 * | 12/2009 | Kelley | A01M 23/20 43/61 |
| 2010/0154287 A1 | 6/2010 | Irons | |
| 2013/0081323 A1 * | 4/2013 | Alfarhan | A01M 23/20 43/62 |
| 2013/0205645 A1 * | 8/2013 | Gaskamp | A01M 31/002 43/62 |
| 2015/0296766 A1 * | 10/2015 | Gaskamp | A01M 23/22 43/61 |
| 2016/0302383 A1 * | 10/2016 | Frieden | A01K 5/02 |
| 2018/0077919 A1 * | 3/2018 | McNew | A01K 3/00 |
| 2019/0150426 A1 * | 5/2019 | Priefert | A01M 23/38 |

FOREIGN PATENT DOCUMENTS

| | | |
|---|---|---|
| CN | 01166271 A | 12/1997 |
| CN | 205814491 U | 12/2016 |
| GB | 692318 | 6/1953 |
| KR | 1020100070531 A | 6/2010 |

* cited by examiner

*Primary Examiner* — Christopher D Hutchens
(74) *Attorney, Agent, or Firm* — James E. Walton (57) ABSTRACT

A system and method for trapping and securing wild animals, especially hogs, by using a flexible perimeter fence attached to a counter weight. Springing of the traps drops the counterweight and pulls up the perimeter fence around the wild hogs. A modular frame breaks down easily for users to carry the automated hog trap into and out of the backcountry easily.

19 Claims, 7 Drawing Sheets

AUTOMATED HOG TRAP

BACKGROUND

1. Field of the Invention

The present invention relates generally to trap for containing wild hogs, and more specifically to a system and method for containing wild hogs in an enclosure that raises to entrap them in a circular enclosure.

2. Description of Related Art

There are many types of the traps for securing wild hogs known. Conventional traps utilize gravity to close doors and prevent wild hogs from exiting the traps. Conventional traps are heavy and difficult to transport to a remote location where hogs likely exist. Additionally conventional traps have a caged area and a trap door for hogs to enter the cages area. Wild hogs can be hesitant to enter the conventional traps because of the compactness of the conventional trap door. Thus, there exists significant room for improvement in the art for overcoming these and other shortcomings of conventional hog traps.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the automated hog trap are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
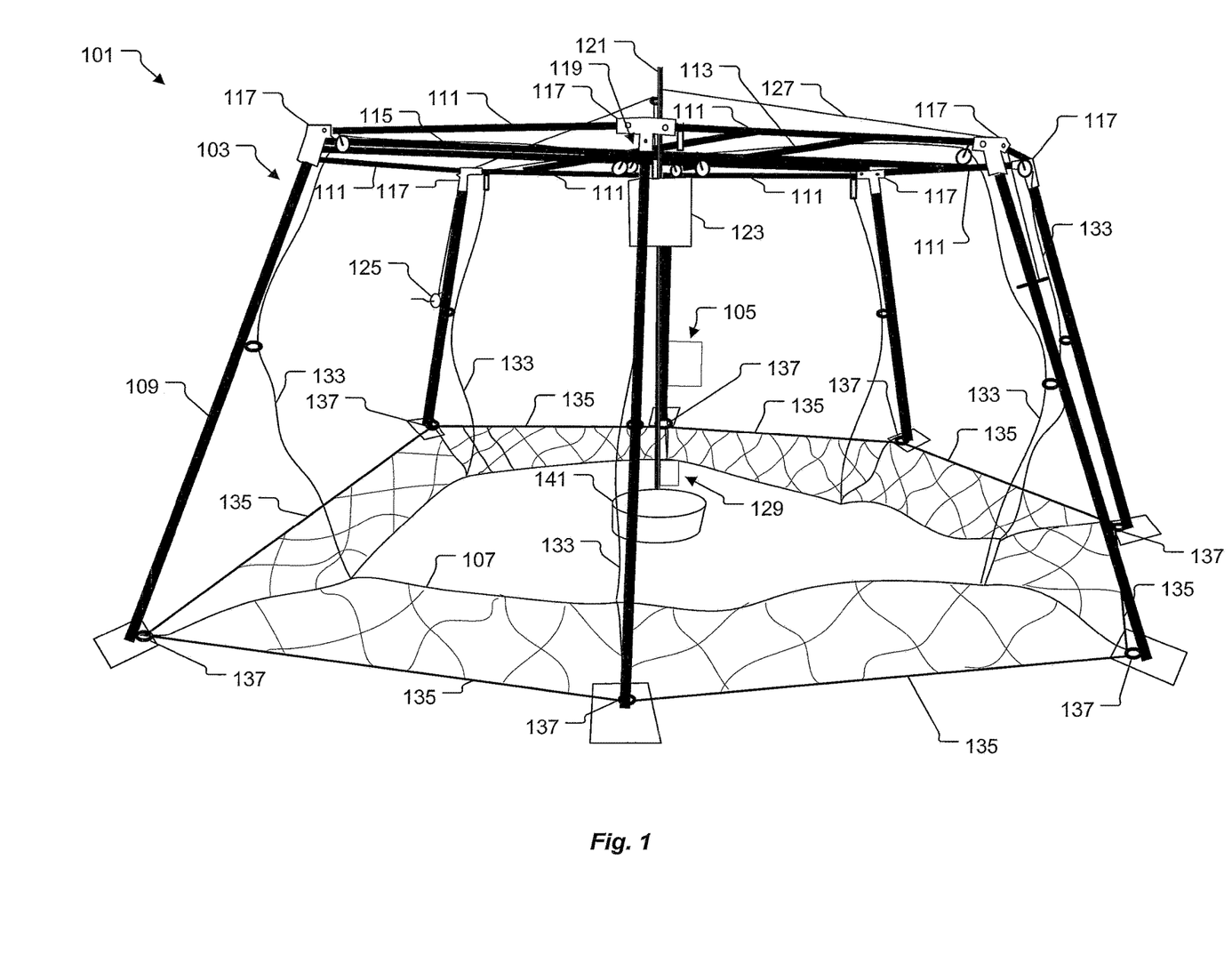
FIG. 1 is a perspective view of an automated hog trap before activation according to the present application.

Referring now to FIG. 1 in the drawings, a preferred embodiment of an automated hog trap before activation according to the present application is illustrated. System 101 is comprised of a frame 103, an activation system 105, and a containment system 107. Frame 103 is comprised of a plurality of leg members 109, a plurality of lateral members 111, a first truss 113, a second truss 115, and a plurality of interconnect members 117. Leg members 109 are tubular support pieces of the frame 103 and are rigidly coupled to the lateral members 111 by the interconnect members 117. While the preferred embodiment utilizes round tubing for the leg members, lateral member, and trusses, it should be apparent that square tubing can be used. As illustrated there are seven lateral members 111 and seven leg members to form a polygon with sloped sides. First truss 113 and second truss 115 are rigidly supported by the lateral members 111. Alternative embodiment of each truss are comprised of an upper and lower member having with interconnected members for traps having a diameter typically over 40 ft in diameter. Frame 103 is configured to be modular and capable of being broke down and transported easily. Furthermore, some installations of the system 101 are permanently affixed to ground by concrete bases for each leg to be fastened to. Each leg member is further comprised of a plate attached to the bottom of the leg member. Stakes can be utilized to secure the leg members to the installation surface through the plates dependent upon the type of animal to be trapped. For example, a wild hog needs a 36" long stake to secure the leg, whereas a deer would not need a stake. Typically, the stakes are rebar or t-posts dependent upon soil conditions and animal type. Fasteners are utilized between the interconnect members and the lateral members to secure the lateral member 111 to the interconnect member. Fasteners are utilized between the interconnect members 117 and the leg members to secure the leg member 109 to the interconnect member. Fasteners are typically a nut and bolt or a pin and a clip.

Activation system is comprised of a locking system 119, a vertical member 121, a counterweight 123, a lifting system 125, a guide wire 127, and a trip wire 129. Locking system 119 is located adjacent to the counterweight 123 and prevents the counterweight from sliding up along the vertical member without a lock being disengaged. Locking system 119 is preferable a plurality of rotating members that radial extend from the vertical member that allow the counterweight to fall but not rise until the rotating members are pivoted. Alternatively, locking system 119 is comprised of a locking gear engaged to a track located on the vertical member. Vertical member 121 is secured into the installation surface at a first end and centered normal to a plane of the two trusses. Guide wire 127 is attached to the vertical member 121 and to a leg member opposite the lifting system. Lifting system 125 is comprised of a hand crank and a cable for lifting the counterweight. The user cranks the lifting system which raises the counterweight 123 into place. The user then sets the trip wire 129 so that activation of the trip wire allows the counterweight 123 to fall down the vertical member 121. Alternatively the lifting system is comprised of a motor for lifting the counterweight instead of the hand crank. While the preferred embodiment of the activation system is by trip wire, alternatively the system can be triggered by an electronic activation as a result of a motion sensor, laser detection, video camera, or remote activation through a cellular connection. Furthermore, while the preferred embodiment of the system is a single counterweight for the entire fence, a multi-counterweight system is contemplated by this application.

Containment system 107 is comprised of an annular perimeter fence 131, a plurality of cables 133, along with closed pulleys and eyelets to guide the plurality of cables. Perimeter fence 131 is preferably nylon netting with a breaking strength of 880 pounds with a mesh size of 1 and ¾". The openings in the illustrations are larger than described for illustration purposes. Other types and configurations of netting are contemplated by this application such as high strength Kevlar netting. The fence material is preferably strong and resilient to contain wild hogs therein. Located between bottoms of each leg member 109 is a lower cable 135 retained by a retaining member 137. Retaining member 137 is preferable a pair of annular members each having an opening offset from each other. Alternatively, retaining member is an eyelet. Lower cable 135 is used to retain the bottom portion of the annular perimeter fence 131. 36" stakes can be used to hold lower cable 135 adjacent to the installation surface and prevent animals from lifting the fence 131. Lower cable 135 is typically threaded into the mesh of the fence to maximize strength between lower cable 135 and fence 131. The upper portion of the annular perimeter fence is coupled to the counterweight 123 by the plurality of cables 133. As the counterweight 123 is raised, the plurality of cables 133 are slack and the fence falls to the installation surface. As the counterweight drops the cables 133 are placed under tension and the fence is lifted into place. Container 141 is located in the installation surface and typically contains feed suitable for the animals to be trapped.

Figure 2:
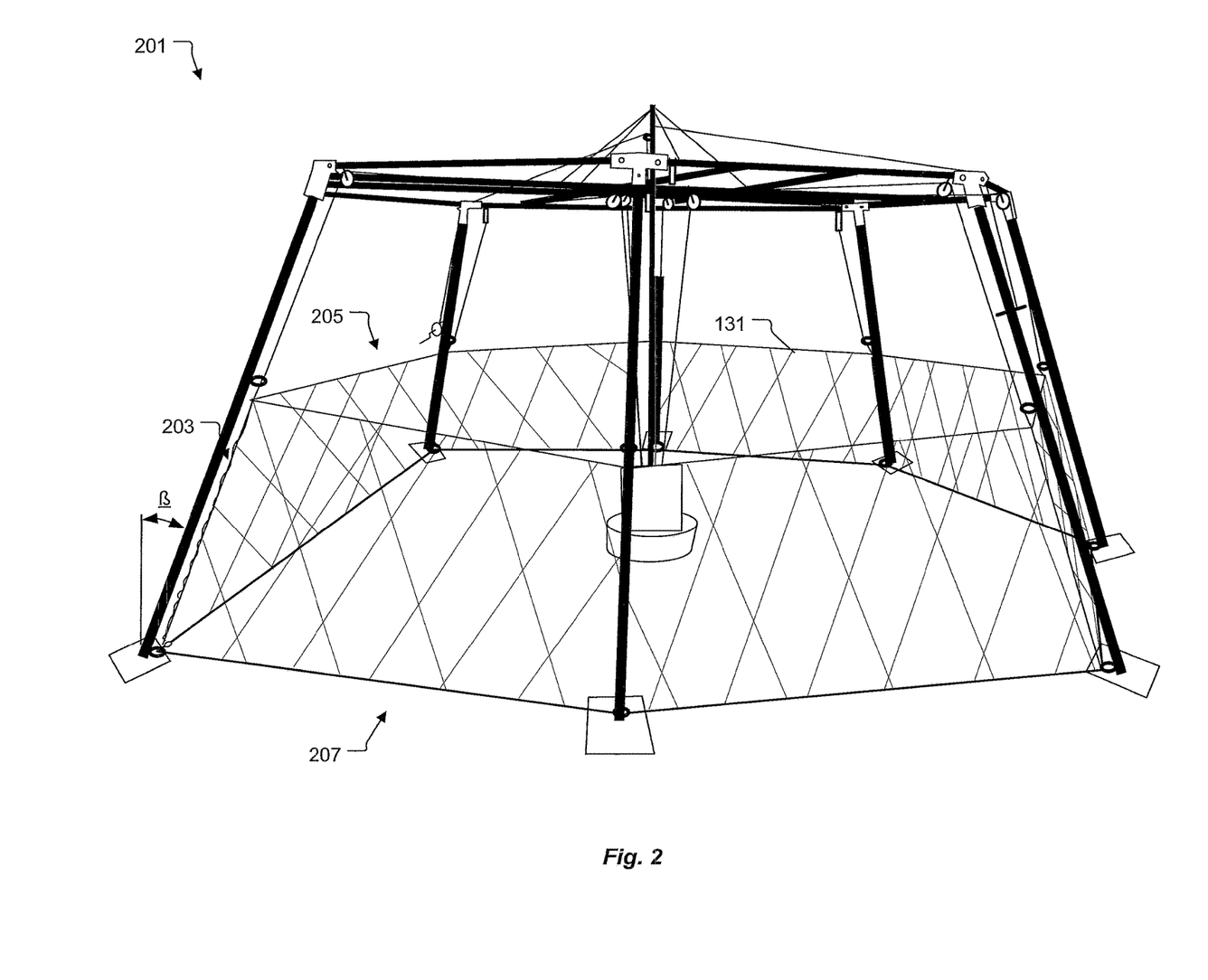
FIG. 2 is a perspective view of an automated hog trap after activation according to the present application.

Referring now also to FIG. 2 in the drawings, a preferred embodiment of an automated hog trap after activation according to the present application is illustrated. System 201 is comprised of the same elements as system 101. System 201 illustrates the fence material raised into position after activation of the activation system and the counterweight dropping. Furthermore, multiple systems 201 can be arrayed to form a multi-zonal trap having a plurality of independent traps ganged together forming one very large trap. Angle ß is preferably 22°, however other angles are contemplated between 5° through 55°. Angling the leg members at less than 90° reduces the trapped animal's ability to escape from climbing over the fence. Furthermore, system 201 features a seam 203 in the netting. Seam 203 is located between and couples together the first 205 and last 207 side panels of the trap. While the system is illustrated with seven side panels, more or less side panels are contemplated by this application.

Figure 3:
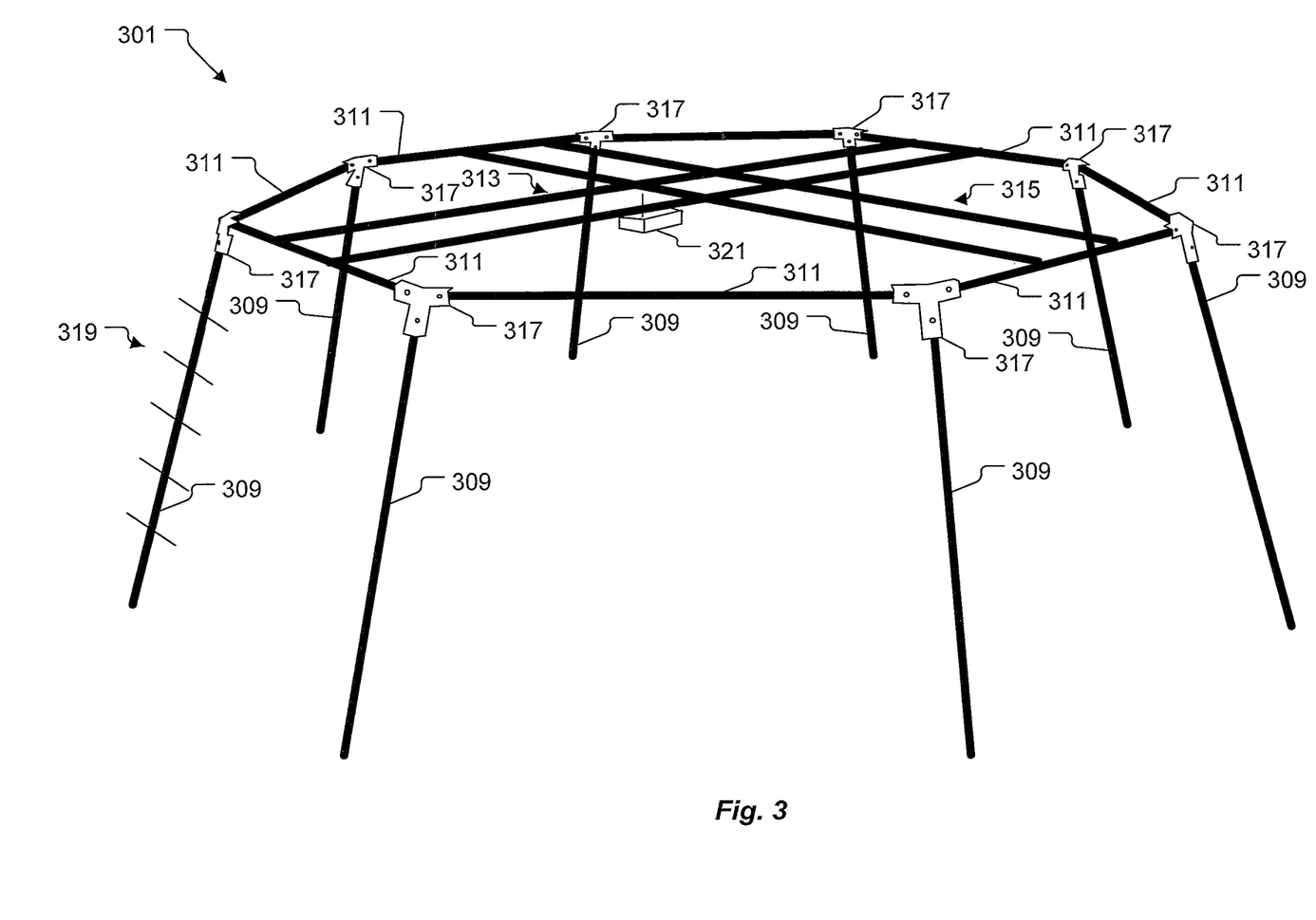
FIG. 3 is a perspective view of a frame of an automated hog trap according to the present application.

Referring now also to FIG. 3 in the drawings, a preferred embodiment of an automated hog trap frame according to the present application is illustrated. Frame 301 is comprised of a plurality of leg members 309, a plurality of lateral members 311, a first truss 313, a second truss 315, and a plurality of interconnect members 317. As illustrated at least one of the leg member comprises a plurality of spaced elements 319 configured to be a ladder and provide access to above the fence. Spaced elements 319 as shown are rungs of a ladder, however openings spaced to receive a removable rung are contemplated by this application. Furthermore, an electronic package 321, facing downwards into the trap, is located on the trap to detect animals and activate the counterweight as needed. In this embodiment, the electronic package 321 is comprised of a motion sensor in conjunction with a camera coupled to remote viewer and a wireless system. The remote viewer is notified of the motion by the motion detector and video is remotely provided to the user by the camera to allow the remote user to verify the contents of the trap before activation of the trap, Once the user is ready they can remotely activate the activation system and raise the fence. The user can then verify the contents of the activated trap by camera and the condition of the trap itself by the camera. Furthermore, the trap can be activated by an electronic signal from a cell phone, a pager, a keyless remote, and other wireless electronic devices.

Figure 4:
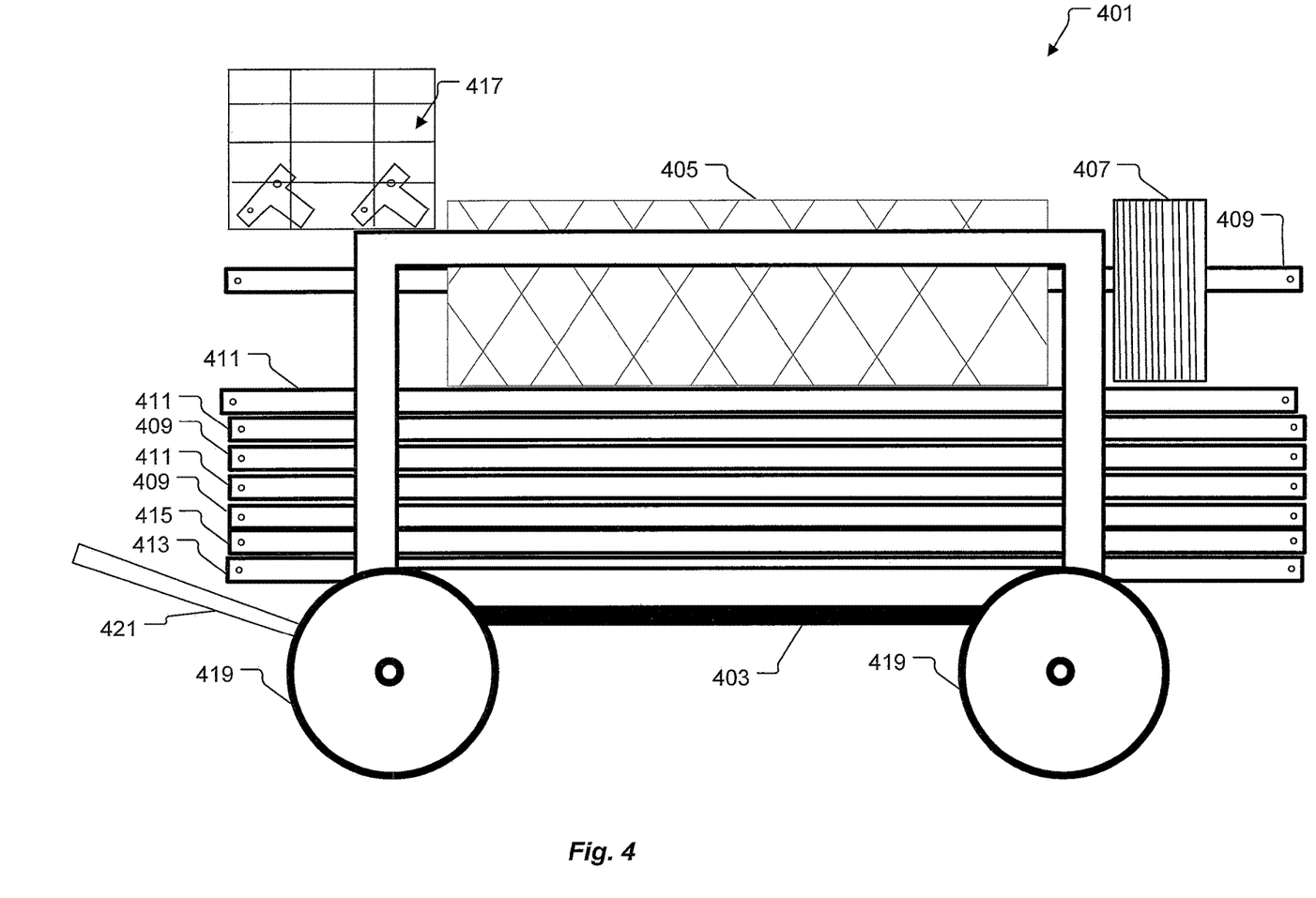
FIG. 4 is a side view of an automated hog trap during transport according to the present application.

Referring now also to FIG. 4 in the drawings, a preferred embodiment of an automated hog trap during transportation according to the present application is illustrated. System 401 is comprised of a cart 403, a roll of fence material 405, a spool of cables 407, plurality of leg members 409, a plurality of lateral members 411, a first truss 413, a second truss 415, and a plurality of interconnect members 417 in a container. In the preferred embodiment the wheels 419 are solid and at least 20 pounds apiece and can be stacked to form the counterweight. System 401 is easily transported by coupling the cart to a four wheeler or pulling with a handle 421. The user transports the broke down automatic hog trap to the desired location via cart 403. The user removes the elements of the cart that form the hog trap such as the wheels, trusses, and the leg members and forms an automated hog trap 101. The user then can reverse the process and detach all the parts to form the cart 403 and haul the trap out of the woods.

Figure 5:
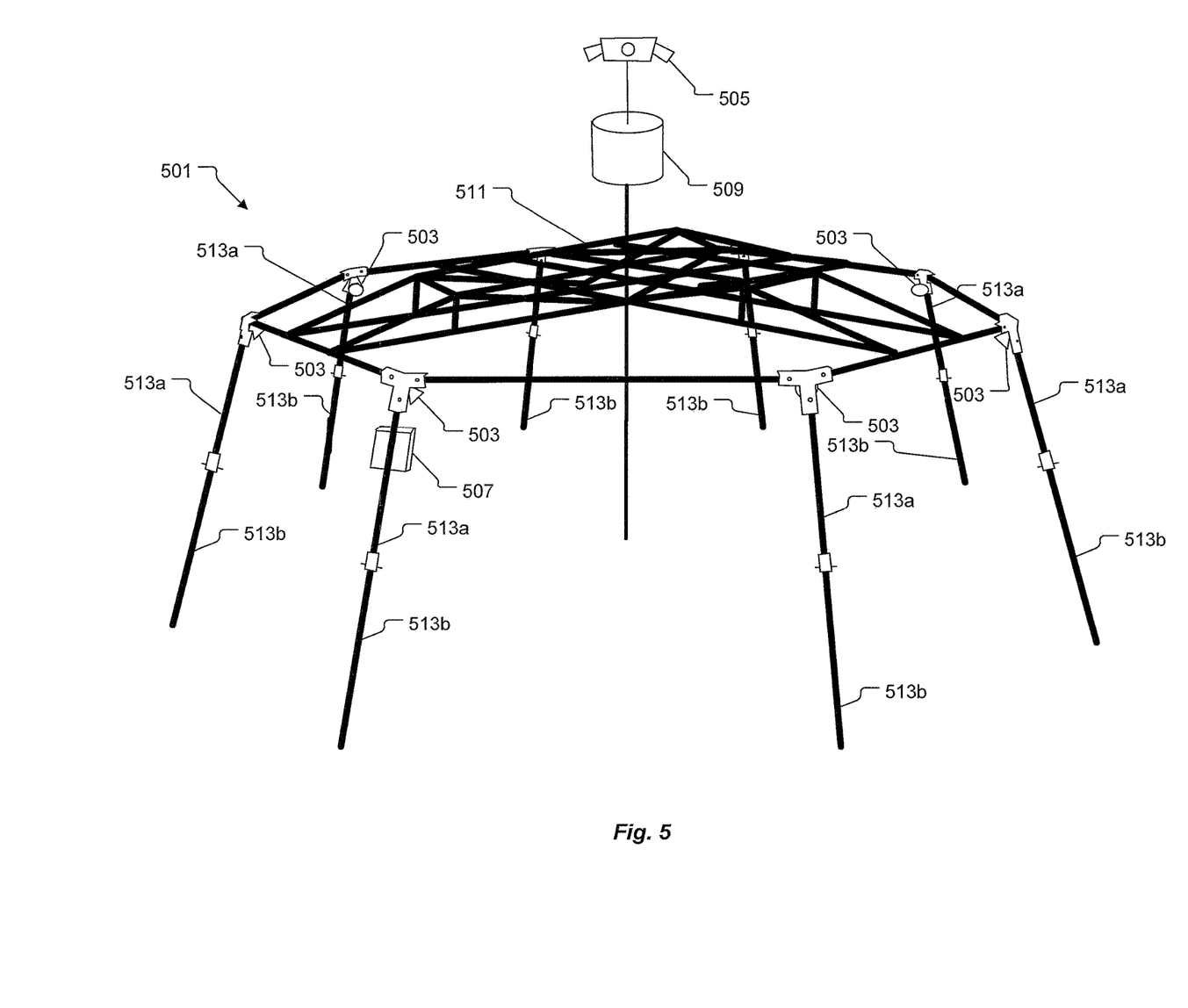
FIG. 5 is a perspective view of a frame of an automated hog trap according to the present application.

Referring now also to FIG. 5 in the drawings, an alternative embodiment of an automated hog trap according to the present application is illustrated. Trap 501 is comprised of elements like that of trap 201. Some elements, such as fencing material and cables, are omitted from the illustration for clarity. However, trap 501 is further comprised of a plurality of lighting elements 503, a first camera system 505, a second camera system 507, a grain feeder 509, reinforced trusses 511, and modular leg members 513. Lighting elements 503 are preferably a set of light emitting diodes facing generally downwards located preferably on the interconnect members, but alternatively are located on an upper portion of the trap to illuminate the contents. Lighting elements 503 are preferably green colored lights configured to be invisible to the contents of the trap. The lighting elements 503 can be controlled to activate during darkness, during darkness and motion, motion, remotely activated with trap, and/or remotely activated without activation of the trap. First camera system 505 is located above the trap, typically on the vertical member, and can film the contents of the trap from a bird's eye perspective. First camera system 505 can be comprised of a plurality of cameras or a single camera capable of viewing the entire contents of the trap. Second camera system 507 is located on a leg member and films the contents of the trap from the side. Both camera systems are capable of providing remote viewing to users located away from the trap to allow remote users to view if the trap has been activated, is the trap full, does the trap need to be remotely activated. Both camera systems are also configured to record video for later viewing by the users. Grain feeder 509 is a conventional feeder attached to the trap. Feeder 509 is configured to retain grains and corn and to release them over time to feed animals. Feeder 509 entices animals to enter the trap repeatedly to feed. The trap can be disengaged for a period of time during feeding cycles so the animals develop a cycle of feeding without entrapment. Reinforced trusses 511 are comprised of additional structural members to provide rigidity for the trap having a large diameter. Furthermore, additional vertical members are contemplated to help support the top of the trap. Modular leg members 513 are comprised of an upper leg member 513a and a lower leg member 513b. Upper leg member 513a utilizes a welded connecting member having an opening to receive the lower leg member 513a. The lower leg member 513b is pinned to the upper leg member 513a to prevent disengagement of the two elements.

Figure 6:
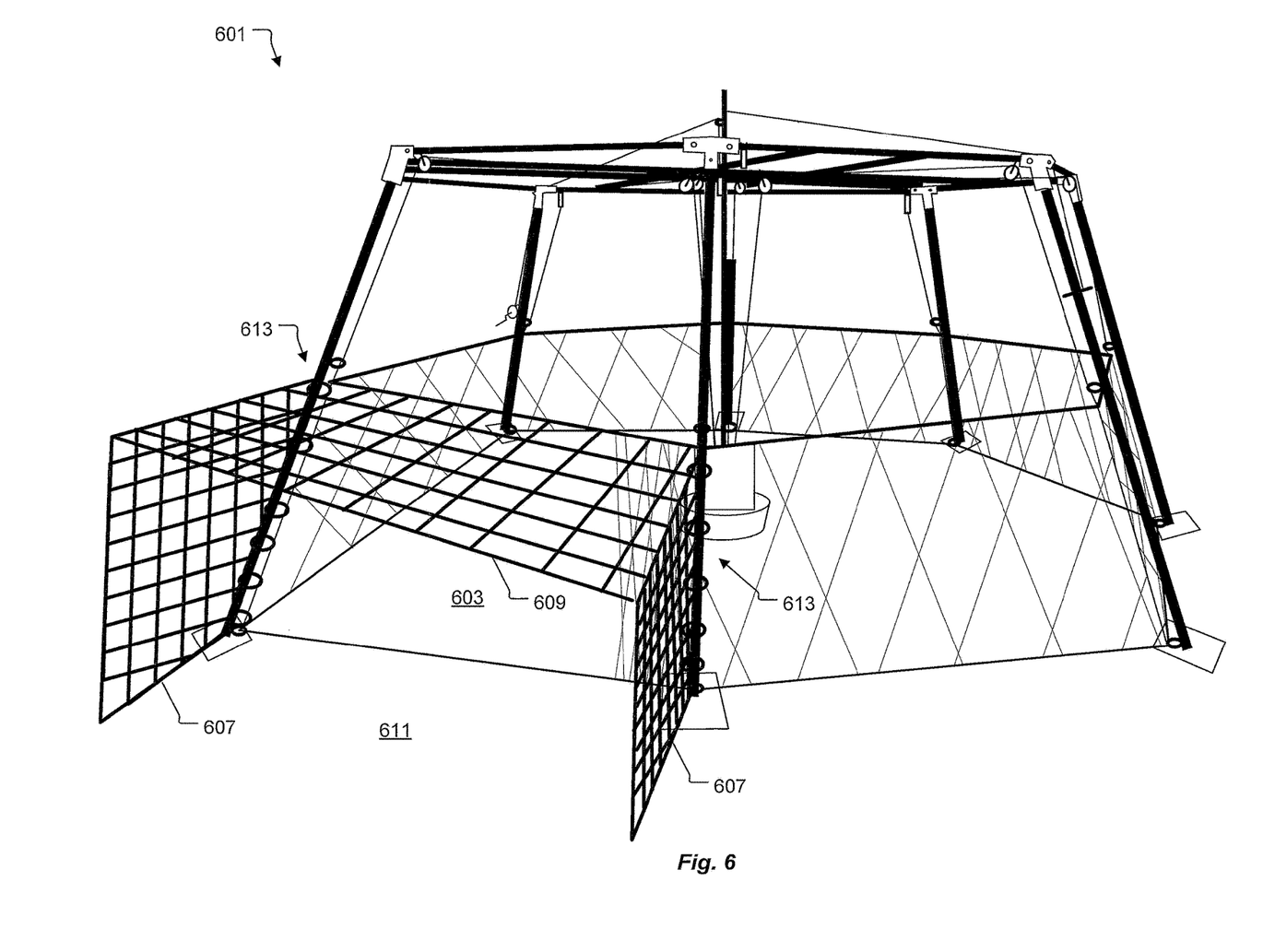
FIG. 6 is a perspective view of an automated hog trap configured for animal removal according to the present application.

Referring now also to FIG. 6 in the drawings, an alternative embodiment of an automated hog trap configured for animal removal according to the present application is illustrated. Trap 601 is comprised of elements like system 201, however trap 601 is configured for the removal of animals from the activated trap.

An opening 603 large enough for animals to be removed is formed in the netting. A pair of side panels 607 are pinned to the leg members and a top panel 609 is placed on top of the side panels 607. Furthermore, a trailer closes the open side of the panels, to form a pen 611 adjacent the trap. Side panels 607 are configured to pin with leg and be angled based upon the angle of the leg members. Once the pen is formed, the netting is coupled to adjacent leg members by clips 613. The seam is then opened and the netting is translated along the upper and lower wires to form opening 603. Because the netting is clipped to the leg members the netting remains taunt while opening 603 exists. The process is reversed to close opening and restore the netting for the trap.

Figure 7:
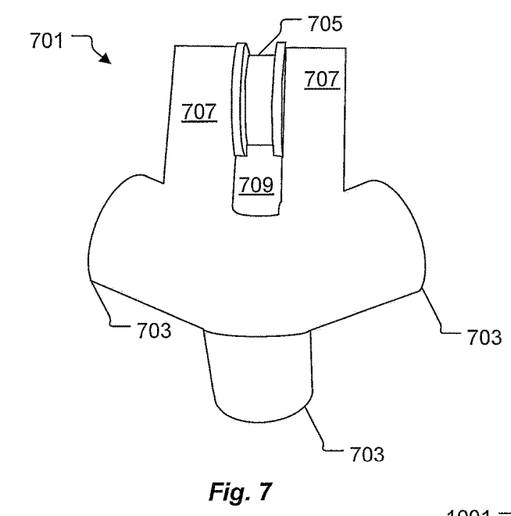
FIG. 7 is a perspective view of an interconnect member of an automated hog trap according to the present application.

Referring now also to FIG. 7 in the drawings, an interconnect member of an automated hog trap according to the present application is illustrated. Interconnect member 701 is comprised of a plurality of connecting ends 703 and a bearing 705 located between two flanges 707. Bearing 705 features flanges and an adjacent opening 709 to retain the cable between the counterweight and the netting.

Figure 8:
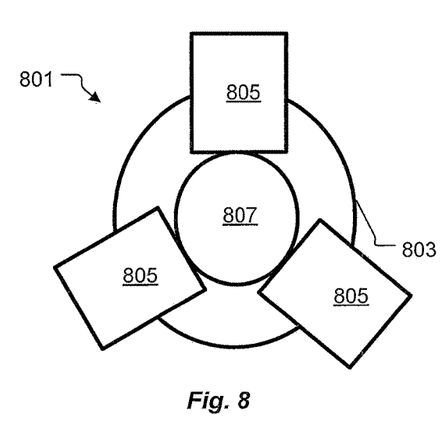
FIG. 8 is a top view of a locking system of an automated hog trap according to the present application.

Referring now also to FIG. 8 in the drawings, a locking system of an automated hog trap according to the present application is illustrated. Locking system 801 is comprised of an annular ring 803 retaining a plurality of spaced rotating members 805. Rotating members 805 pivot about the annular member and prevent the counterweight from sliding up the vertical member 807.

Figure 9:
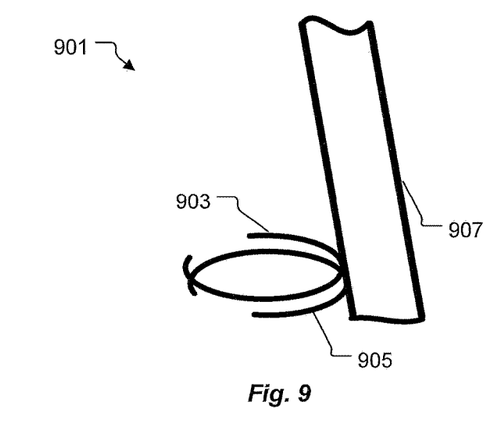
FIG. 9 is a perspective view of a retaining member of an automated hog trap according to the present application.

Referring now also to FIG. 9 in the drawings, a retaining member of an automated hog trap according to the present application is illustrated. Retaining member 901 is comprised of a first ring 903 and a second ring 905. Both rings are rigidly attached to the leg member 907. Both rings are generally parallel to each other and spaced apart a distance for the lower cabling to pass between. Furthermore, each ring is partially cut open and offset from each other to allow the lower cable to be inserted between the rings and rotated to be retained by both rings. The lower cable cannot be removed because the openings on each ring are offset from the other without reversal of the cable installation. This configuration allows the lower cable of the netting to be attached to the legs once the lower cable has been snaked through the openings of the netting.

Figure 10:
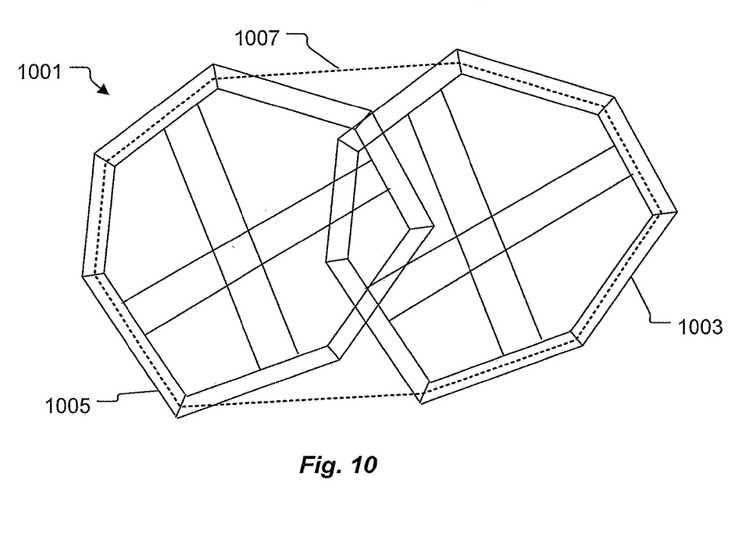
FIG. 10 is a top view of a plurality of automated hog traps according to the present application.

Referring now also to FIG. 10 in the drawings, a plurality an automated hog traps according to the present application are illustrated. System 1001 is comprised of a first trap 1003, a second trap 1005, and a net 1007. Net 1007 spans around both traps and allows users to place multiple traps and contain more animals. While only two traps are illustrated, more collocated traps with communal features, such as netting, activation systems, are contemplated by this application.

The automated hog trap is an improvement over conventional traps because no small opening is required. Multiple animals that travel in packs can be trapped concurrently. The circular nature of the trap is calming to trapped animal as they can run around and around the trap. Animals are familiar with the shape of typical gravity feeders and the shape of the counterweight mimics gravity feeders thereby animals desirous of food will enter the automated trap in search of feed such as corn thereby activating the counterweight and raising the fence.

It is apparent that a system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An automated hog trap, comprising:
   a frame located on a ground surface, the frame including sectional leg members, truss members, and lateral members;
   a containment system, comprising:
      a net suspended within a perimeter of the frame, the net being attached to interior portions of the frame and being configured to form a fence; and
      a plurality of retaining rings, each retaining ring encompassing a corresponding leg member;
   an activation system supported by the frame;
   wherein the activation system raises the net to form the fence once triggered.

2. The trap according to claim 1, further comprising:
   a plurality of pulleys supported by the frame; and
   a plurality of cables coupling the net to the activation system;
   wherein the plurality of cables are retained by the plurality of pulleys.

3. The trap according to claim 1, wherein the activation system is entirely mechanical.

4. The trap according to claim 1, wherein the activation system is remotely activated by an electronic signal.

5. The trap according to claim 1, wherein the net is comprised of nylon.

6. The trap according to claim 1, wherein the frame is modular, comprising:
   a plurality of interconnect members.

7. The trap according to claim 6, wherein each leg of the plurality of leg members comprises:
   a first end configured to be affixed to the ground surface; and
   a second end configured to be affixed to an interconnect member.

8. An automated hog trap, comprising:
a frame, comprising:
- a plurality of leg members;
- a plurality of truss members;
- a plurality of lateral members; and
- a plurality of interconnect members;

a containment system, comprising:
- an annular shaped net configured to form a fence; and
- a plurality of retaining rings, each retaining ring encompassing a corresponding leg member;
- wherein the annular shaped net is coupled to the retaining rings;

an activation system supported by the frame, the activation system comprising:
- a counterweight coupled to the annular shaped net; and
- a trip wire configured to release the counterweight;
- wherein the activation system raises the annular net to form the fence once triggered.

9. The trap according to claim 8, wherein each leg of the plurality of leg members comprises:
- a first end having a plate; and
- a second end configured to be affixed to an interconnect member of the plurality of interconnect members.

10. The trap according to claim 8, further comprising:
a ladder attached to at least one leg member.

11. The trap according to claim 8, wherein the trap is configured to be transported.

12. The trap according to claim 11, further comprising:
a cart having wheels;
wherein the cart is configured to retain the trap during transport; and
wherein the wheels of the cart form the counterweight.

13. The trap according to claim 8, further comprising:
a plurality of pulleys supported by the frame; and
a plurality of cables coupling the annular shaped net to the activation system;
wherein the plurality of cables are retained by the plurality of pulleys.

14. The trap according to claim 8, further comprising:
wherein each of the retaining members retains and edge of the annular shaped net.

15. An automated hog trap, comprising:
a first frame, having;
- a plurality of sectional leg members;
- a plurality of truss members;
- a plurality of lateral members;
- a plurality of interconnect members having integral bearings; and
- a plurality of retaining members, each retaining member being slidingly coupled to a leg member;

a containment system, having;
- an annular shaped net configured to form a fence;
- wherein the annular shaped net is within a perimeter and attached to interior portions of the first frame; and
- wherein each retaining member comprises a pair of annular members having openings offset from each other; and an activation system supported by the first frame, the activation system comprising:
- a counterweight coupled to the annular shaped net;
- a locking system; and
- a trip wire configured to release the counterweight;
- wherein the activation system raises the fence once triggered.

16. The trap according to claim 15, further comprising:
a second frame;
wherein the annular shaped net is supported by the first frame and the second frame.

17. The trap according to claim 15, further comprising:
a camera system.

18. The trap according to claim 15, further comprising:
a lighting system.

19. The trap according to claim 15, further comprising:
a closable opening formed in the annular net;
a first side panel;
a second side panel; and
a top panel;
wherein the panels form a pen adjacent and attached to the trap around the opening.

* * * * *